Patented Sept. 12, 1933

1,926,691

UNITED STATES PATENT OFFICE 1,926,691

PROCESS FOR THE PRODUCTION OF DIMETHYL AMINE

Lloyd C. Swallen and Jerome Martin, Terre Haute, Ind., assignors to Commercial Solvents Corporation, Terre Haute, Ind., a corporation of Maryland No Drawing. Application December 24, 1931
Serial No. 583,137

15 Claims. (Cl. 260—127)

The present invention relates to the production of di-methyl amine. More specifically, the present invention relates to the production of di-methyl amine and ammonia from mono-methyl amine.

In the past, methyl amines have been prepared synthetically by a number of different methods, among which is the process of using ammonia and methanol as the reactants. According to this process, ammonia and alcohol vapor are passed over dehydrating catalysts or amination catalysts at elevated temperatures. According to this method, a mixture of mono-, di- and tri-methyl amines is obtained and it has been found to be practically impossible to obtain only a single amine as the product. It has been attempted to secure a predominance of the desired amine by varying the ratio of the reactants and by including the undesired amines in the reactant mixture. However, these procedures have certain inherent disadvantages, for example, the low conversion per unit of gas passed over the catalyst. It is therefore apparent that it would be desirable to carry out the reaction under conditions allowing the highest conversion and to secure the desired amine from the undesired amines produced in the reaction.

It has now been found that di-methyl amine can be produced from mono-methyl amine according to the following reaction:

$$2\text{MeNH}_2 \rightarrow \text{Me}_2\text{NH} + \text{NH}_3.$$

This reaction has been found to take place under the same conditions and using the same catalysts as employed in the synthesis of amines from methanol and ammonia. The reaction may be carried out at temperatures from 350-500° C., but preferably between 425 and 475° C. Space velocities (c.c. of gas mixture per c.c. of catalyst) between 50 and 5000 may be employed, but it is preferred to operate at space velocities between 400 and 1000. Since the number of molecules of catalyst and products are equal, the pressure employed has no marked effect on the reaction. It is preferred, however, to operate at atmospheric pressure.

The catalysts which may be employed are dehydrating catalysts or amination catalysts such as alumina, partially dehydrated aluminum trihydrate, aluminum silicate, blue clay, Doucil, Putnum clay, Indianaite, feldspar, blue oxide of tungsten, chromic oxide, silica, thoria, titania, etc. Of these, it is preferred to use aluminum silicate or the partially dehydrated aluminum trihydrate, but it is to be understood that any amination catalyst may be employed.

When operating according to the above conditions, satisfactory conversions of mono-methyl amine to di-methyl amine and ammonia are obtained and only small amounts of by-products are formed. It is, of course, possible for side reactions to take place such as the reaction between mono-methyl amine and di-methyl amine to yield tri-methyl amine and ammonia. However, only small amounts (less than 10% in all cases) of tri-methyl amine are formed so that it is probable that the reaction to form di-methyl amine has a higher velocity under the conditions employed than that of the side reactions. However, it is to be understood that the present invention is not to be limited to any particular theory by which it may operate.

It is also to be understood that the present invention is applicable to mixtures of amines as well as to pure mono-methyl amine. Any di-methyl amine which may be in the mixture may of course have a tendency to reverse the reaction and thus diminish the conversion of mono-methyl amine to di-methyl amine. However, under the conditions employed, this effect is not pronounced when relatively small amounts of di-methyl amine are included in the mixture. For example, in the separation of mono-, di- and tri-methyl amines by distillation methods, a fraction is obtained which contains about 87% mono-methyl amine and about 13% tri-methyl amine. It has been found that such a mixture is eminently suited for use in the present reaction and that the tri-methyl amine need not be first separated.

The invention may best be illustrated by the following example: The fraction of liquid amines containing about 87% mono-methyl amine and 13% tri-methyl amine which is obtained in the separation of mono-, di- and tri-methyl amines by distillation methods, is conducted under its own pressure from the storage tanks to the feed tanks where it is measured. The mixture is then sent through a regulating valve and flowmeter, where the space velocity is adjusted to about 550, into a steam jacketed vaporizer and thence to a direct fired preheater where it is heated to a temperature somewhat below the reaction temperature. The mixture is then passed over a catalyst consisting of partially dehydrated aluminum trihydrate which is maintained at a temperature such that the hottest part of the catalyst mass is maintained at about 450° C. The gases leaving the catalyst are then passed through an air cooled pipe, a strainer to remove particles of entrained catalyst and a water-jacketed pipe which cools the gas to about 20-40° C. and removes any water or other material condensable at such temperatures. The gas mixture leaving the catalyst is found to consist of about 30% ammonia, 26% mono-methyl amine, 30% di-methyl amine and 14% tri-methyl amine. This mixture may be sent to storage tanks or may be sent directly to distillation apparatus where it is separated into its constituents by any of the known means.

The following table will illustrate the results obtained when carrying out the reaction with various reaction mixtures and under various conditions using partially dehydrated aluminum trihydrate as the catalyst:

Table I

| Feed | Temperature | Space velocity | Product | | | |
|---|---|---|---|---|---|---|
| | | | $NH_3$ | $CH_3NH_2$ | $(CH_3)_2NH$ | $(CH_3)_3N$ |
| 100% $CH_3NH_2$ | 450 | 550 | 33.2 | 31.8 | 31.4 | 3.6 |
| | 450 | 550 | 31.8 | 31.3 | 32.6 | 4.3 |
| 87.0% $CH_3NH_2$ | 425 | 400 | 27.0 | 25.3 | 33.1 | 15.6 |
| | 425 | 400 | 25.4 | 29.8 | 27.7 | 17.1 |
| 13.0% $(CH_3)_3N$ | 450 | 670 | 35.2 | 27.6 | 24.4 | 12.9 |
| | 450 | 630 | 39.0 | 33.6 | 16.3 | 11.1 |
| | 450 | 550 | 29.2 | 26.5 | 29.8 | 14.5 |
| | 450 | 550 | 30.4 | 26.4 | 28.6 | 14.6 |
| | 475 | 510 | 40.0 | 28.2 | 16.4 | 15.3 |
| | 475 | 420 | 38.0 | 26.6 | 17.4 | 18.0 |
| 65% $CH_3NH_2$ 20.2% $(CH_3)_2NH$ 14.8% $(CH_3)_3N$ | 450 | 680 | 38.6 | 23.6 | 17.4 | 20.4 |
| | 450 | 350 | 32.0 | 25.8 | 26.2 | 15.9 |

It is to be understood that the present invention is not to be limited to the particular mixtures, catalysts or operating conditions employed in the above examples, but that known equivalents may be employed and the procedure may be modified in any way which would naturally occur to one skilled in the art.

The invention now having been described, what is claimed is:

1. A process for the production of di-methyl amine which comprises passing gaseous mono-methyl amine over an amination catalyst at temperatures in excess of 300° C.

2. A process for the production of di-methyl amine which comprises passing gaseous mono-methyl amine at temperatures from 350-500° C. over an amination catalyst.

3. A process for the production of di-methyl amine which comprises passing gaseous mono-methyl amine at temperatures from 425-475° C. over an amination catalyst.

4. A process for the production of di-methyl amine which comprises passing a mixture of gaseous methyl amines containing a substantially high proportion of mono-methyl amine over an amination catalyst at temperatures in excess of 300° C.

5. A process for the production of di-methyl amine which comprises passing a mixture of gaseous methyl amines containing a substantially high proportion of mono-methyl amine at temperatures from 350-500° C. over an amination catalyst.

6. A process for the production of di-methyl amine which comprises passing a mixture of gaseous methyl amines containing a substantially high proportion of mono-methyl amine at temperatures from 425-475° C. over an amination catalyst.

7. A process for the production of di-methyl amine which comprises passing a mixture of gaseous methyl amines containing a substantially high proportion of mono-methyl amine over metal oxide dehydrating catalysts at temperatures in excess of 300° C.

8. A process for the production of di-methyl amine which comprises passing a mixture of gaseous methyl amines containing a substantially high proportion of mono-methyl amine at temperatures from 350-500° C. over metal oxide dehydrating catalysts.

9. A process for the production of di-methyl amine which comprises passing a mixture of gaseous methyl amines containing a substantially high proportion of mono-methyl amine at temperatures from 425-475° C. over metal oxide dehydrating catalysts.

10. A process for the production of di-methyl amine which comprises passing a mixture of gaseous methyl amines containing a substantially high proportion of mono-methyl amine over dehydrated aluminum trihydrate at temperatures in excess of 300° C.

11. A process for the production of di-methyl amine which comprises passing a mixture of gaseous methyl amines containing a substantially high proportion of mono-methyl amine at temperatures from 350-500° C. over dehydrated aluminum trihydrate.

12. A process for the production of di-methyl amine which comprises passing a mixture of gaseous methyl amines containing a substantially high proportion of mono-methyl amine at temperatures from 425-475° C. over dehydrated aluminum trihydrate.

13. A process for the production of di-methyl amine which comprises passing a mixture of gaseous methyl amines containing a substantially high proportion of mono-methyl amine over aluminum silicate at temperatures in excess of 300 C.

14. A process for the production of di-methyl amine which comprises passing a mixture of gaseous methyl amines containing a substantially high proportion of mono-methyl amine at temperatures from 350-500° C. over aluminum silicate.

15. A process for the production of di-methyl amine which comprises passing a mixture of gaseous methyl amines containing a substantially high proportion of mono-methyl amine at temperatures from 425-475° C. over aluminum silicate.

LLOYD C. SWALLEN.
JEROME MARTIN.